(12) United States Patent
Furuya

(10) Patent No.: US 8,351,698 B2
(45) Date of Patent: Jan. 8, 2013

(54) IMAGE PROCESSING APPARATUS AND CONTROL METHOD THEREOF

(75) Inventor: Kohei Furuya, Tokyo (JP)

(73) Assignee: Canon Kabushiki Kaish, Tokyo (JP)

( * ) Notice: Subject to any disclaimer, the term of this patent is extended or adjusted under 35 U.S.C. 154(b) by 337 days.

(21) Appl. No.: 12/862,393

(22) Filed: Aug. 24, 2010

(65) Prior Publication Data

US 2011/0052060 A1     Mar. 3, 2011

(30) Foreign Application Priority Data

Aug. 31, 2009  (JP) ................................. 2009-201085
Feb. 5, 2010   (JP) ................................. 2010-024831

(51) Int. Cl.
G06K 9/00 (2006.01)
(52) U.S. Cl. ...................................................... 382/168
(58) Field of Classification Search .................. 382/162,
382/167–169, 274, 25; 348/252–254, 221.1,
348/222.1, 223.1, 362–365, 615; 345/589,
345/617; 358/1.9, 3.26–3.27, 516–523
See application file for complete search history.

(56) References Cited

U.S. PATENT DOCUMENTS

| 7,006,692 B2 * | 2/2006 | Matsushima | 382/168 |
| 7,142,712 B2 | 11/2006 | Maruoka et al. | |
| 7,289,154 B2 * | 10/2007 | Gindele | 348/364 |
| 7,424,148 B2 * | 9/2008 | Goh | 382/169 |
| 7,639,893 B2 * | 12/2009 | Duan et al. | 382/274 |
| 8,248,492 B2 * | 8/2012 | Mitsunaga | 348/252 |

FOREIGN PATENT DOCUMENTS

| JP | 3772133 | 5/2006 |
| JP | 4018524 | 12/2007 |

* cited by examiner

*Primary Examiner* — Ishrat I Sherali
(74) *Attorney, Agent, or Firm* — Cowan, Liebowitz & Latman, P.C.

(57) ABSTRACT

An image processing apparatus generates, for an image, partial histograms by dividing a luminance histogram at downward convex parts of a frequency distribution of the luminance histogram. The image processing apparatus calculates, for a partial histogram selected from the partial histograms, a difference between a maximum frequency in each of all the partial histograms located on the first side of the selected partial histogram, and a minimum frequency within a luminance range from a luminance level of the maximum frequency to that of a maximum frequency in the selected partial histogram as a drop, and sets a maximum one of the drops calculated for the respective partial histograms as a drop. The image processing apparatus sets a weight, which becomes smaller as this drop is larger, for the selected partial histogram, and calculates a weighted average of the luminance histogram, thereby acquiring a luminance value for the tone correction.

16 Claims, 12 Drawing Sheets

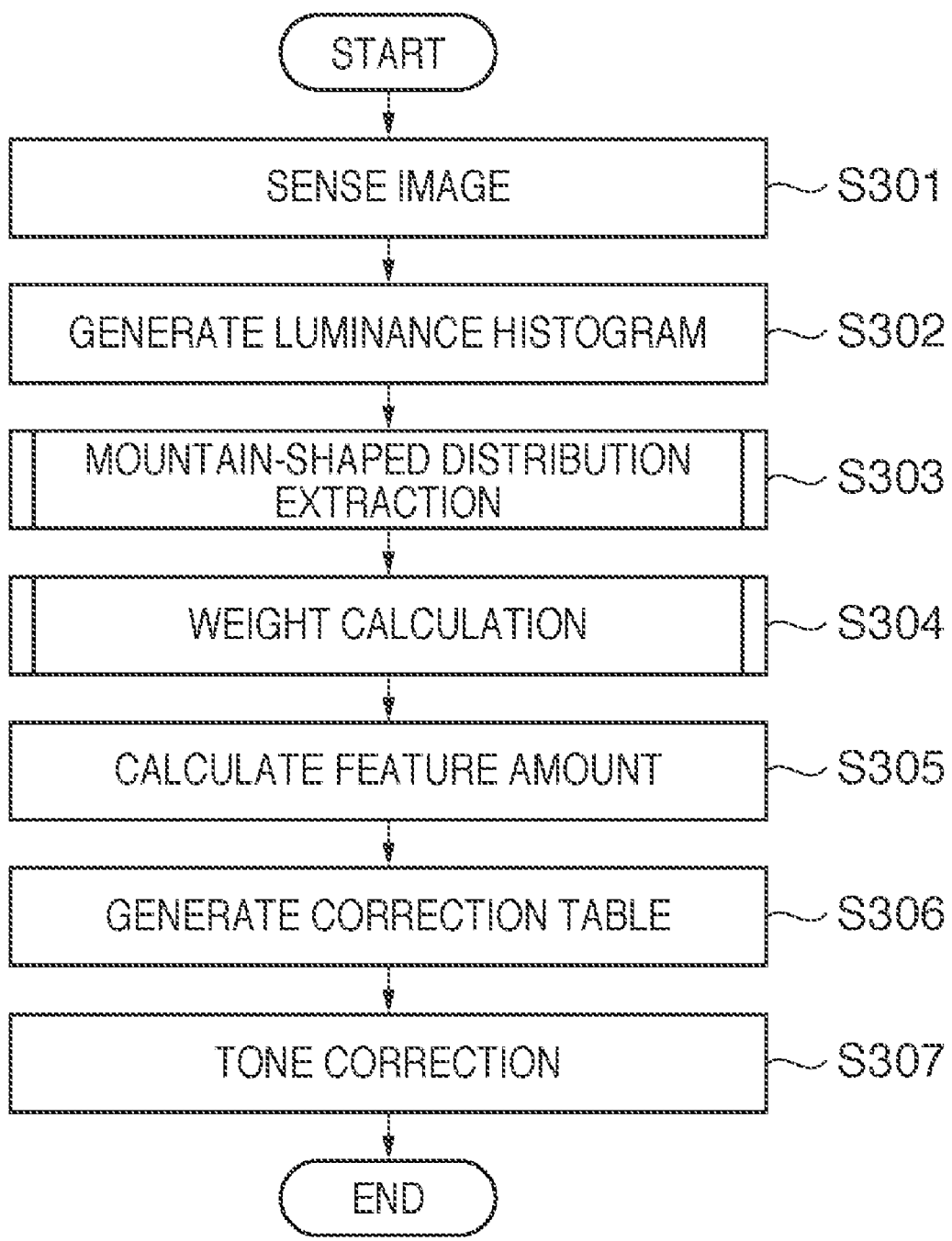

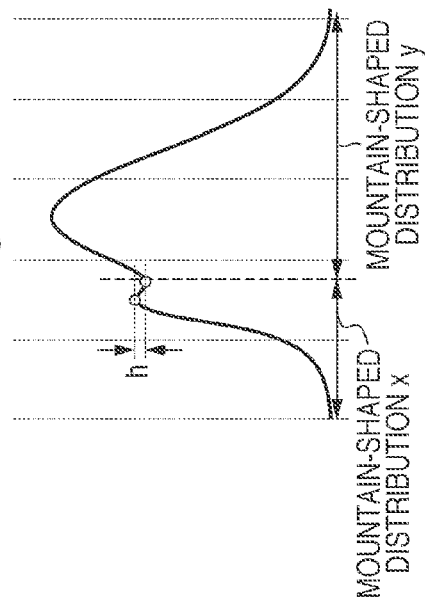
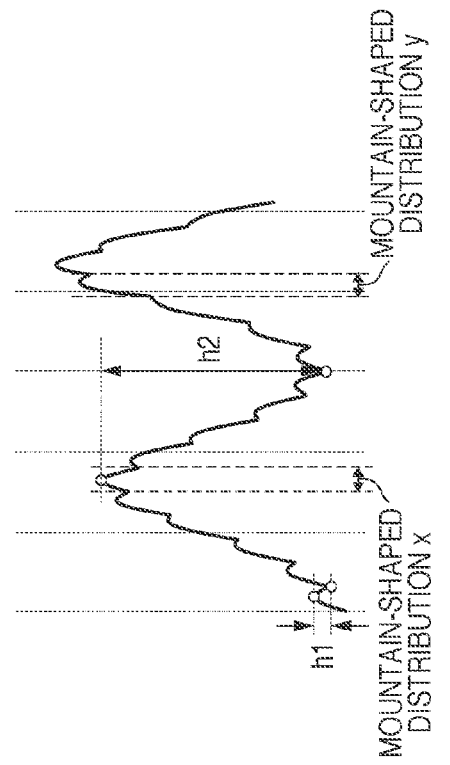
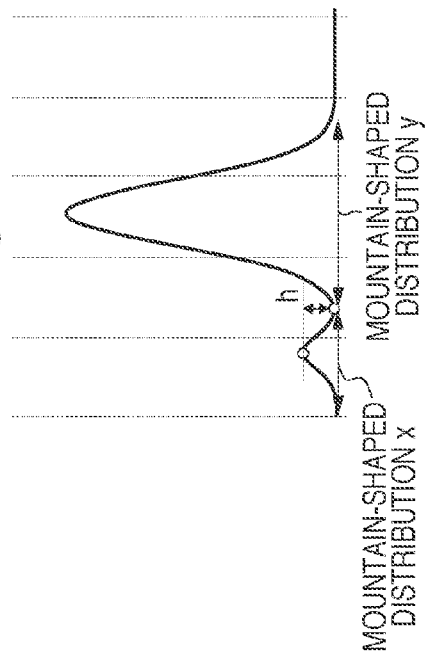
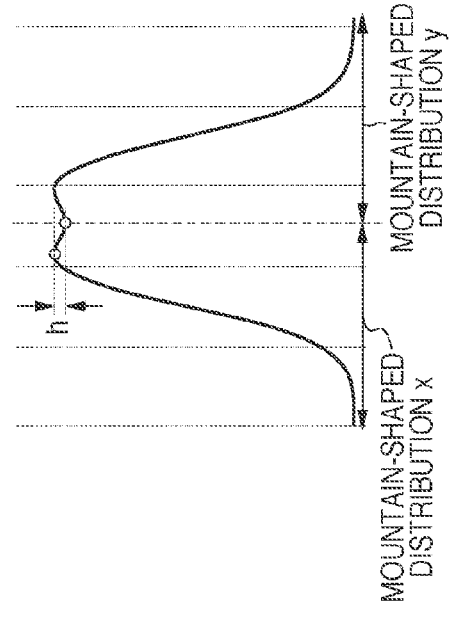

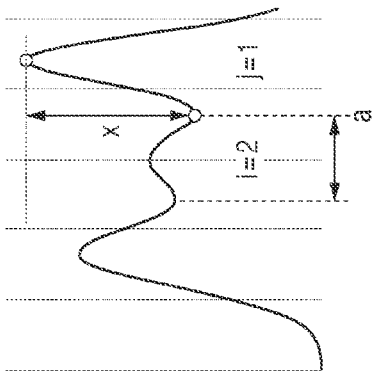
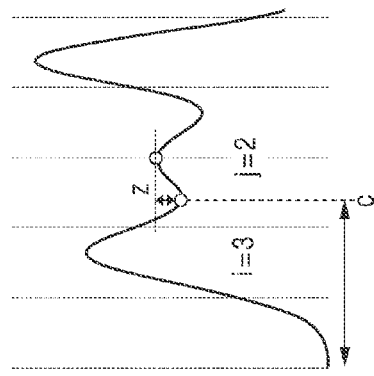
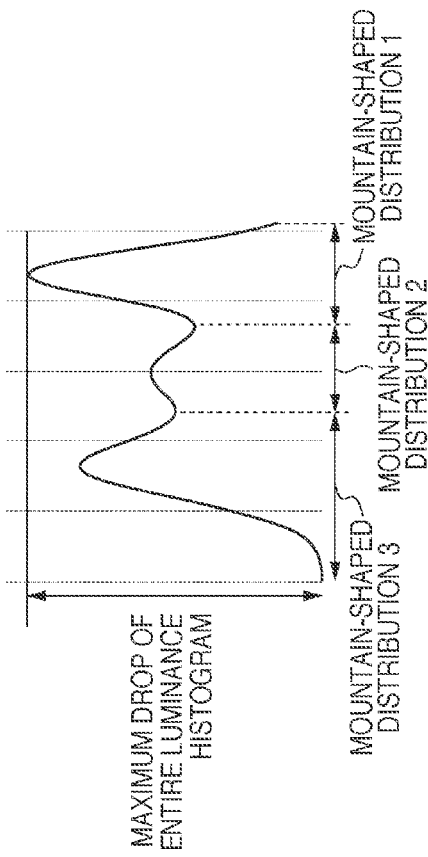
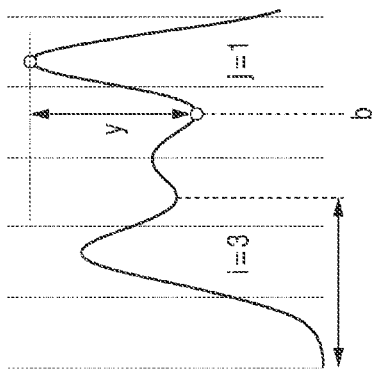

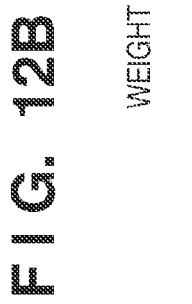
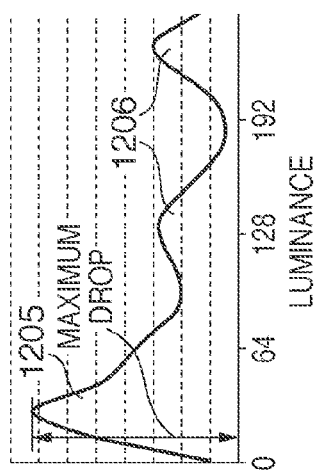
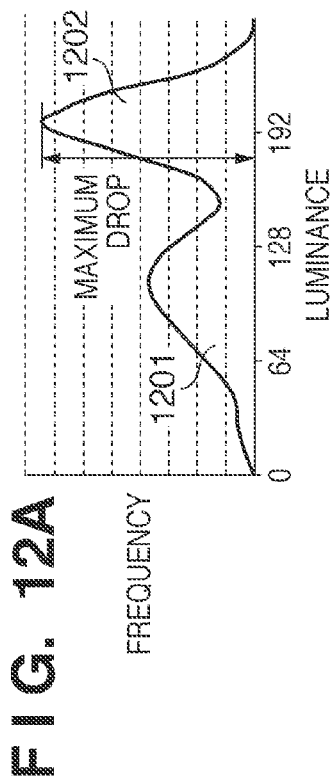
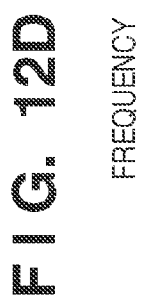
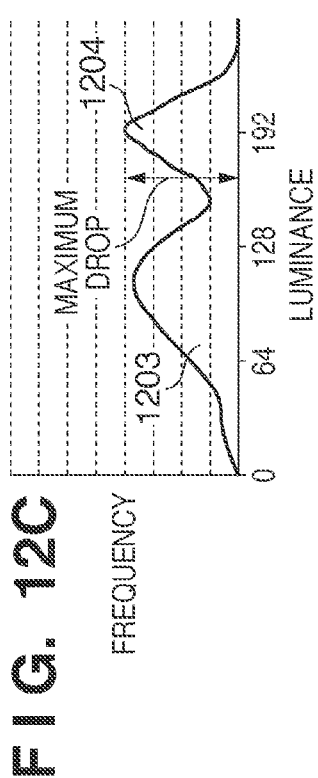
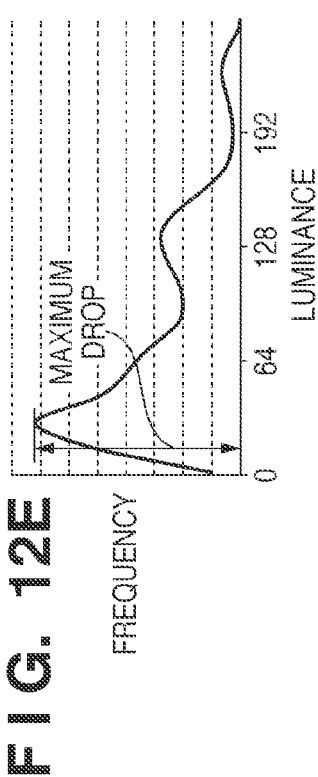
FIG. 12A  FIG. 12B  FIG. 12C  FIG. 12D  FIG. 12E

IMAGE PROCESSING APPARATUS AND CONTROL METHOD THEREOF

BACKGROUND OF THE INVENTION

1. Field of the Invention

The present invention relates to an image processing apparatus which performs tone correction of an input image.

2. Description of the Related Arts

As a conventional tone correction technique, the following technique has been proposed. That is, mountain-shaped distributions are detected from a histogram, a feature amount of a dark part is calculated by calculating, for example, an average luminance of the mountain-shaped distributions at specific positions, and the luminance tone of the dark part is corrected by applying correction for raising that feature amount to a certain target value. Japanese Patent No. 3772133 (to be referred to as JPB3772133 hereinafter) describes an arrangement which calculates a boundary value between a low-luminance part and high-luminance part from mountain-shaped distributions of a histogram, and calculates the barycenter of the low-luminance part as a feature amount of a dark part. Also, Japanese Patent No. 4018524 (to be referred to as JPB4018524 hereinafter) describes an arrangement which calculates, for example, an average luminance of a second brightest mountain-shaped distribution of those which form a histogram as a feature amount of a dark part.

Since the shape of a histogram finely varies depending on objects included in an image, mountain-shaped distributions to be originally extracted cannot often be extracted depending on the shape of the histogram in JPB3772133. JPB4018524 copes with this problem, and adopts a method of smoothing a histogram and coupling a plurality of mountains using a threshold. However, the conventional methods suffer the following problems since they divide a histogram into a low-luminance part and high-luminance part using a threshold (boundary value) or specify a mountain-shaped distribution in which an average luminance value is to be calculated.

That is, with the method using a threshold, even when similar scenes are sensed, different boundary values may be acquired or whether or not to couple mountains may be different depending on slight differences of histograms. In this case, although similar scenes are sensed, tone correction results may be largely different.

SUMMARY OF THE INVENTION

According to one embodiment of the present invention, an image processing apparatus, which can prevent a tone correction amount from varying beyond necessity due to slight histogram differences, and can apply appropriate tone correction to every histogram shapes, and a control method thereof are provided.

According to one aspect of the present invention, there is provided an image processing apparatus for executing tone correction of luminance values in an image, comprising:

a generation unit configured to generate, for the image, a luminance histogram in which frequencies indicating numbers of pixels for respective luminance values are arranged in an order of luminance values from a first side to a second side;

a dividing unit configured to generate a plurality of partial histograms by dividing the luminance histogram at downward convex parts in a frequency distribution of the luminance histogram;

a calculation unit configured to select one of the plurality of partial histograms as a partial histogram of interest, to calculate, as a drop candidate, a difference between a maximum frequency in one partial histogram located on the first side of the partial histogram of interest, and a minimum frequency within a range from a luminance level corresponding to the maximum frequency to a luminance level corresponding to a maximum frequency in the partial histogram of interest, and to determine, as a drop of the partial histogram of interest, a maximum one of the drop candidates calculated for all the partial histograms located on the first side of the partial histogram of interest;

a setting unit configured to set, for the partial histogram of interest, a smaller weight with increasing drop; and a correction unit configured to execute the tone correction using a luminance histogram obtained by applying weights set by the setting unit respectively to the plurality of partial histograms.

Also, according to another aspect of the present invention, there is provided an image processing apparatus for executing tone correction of luminance values in an image, comprising:

a generation unit configured to generate, for the image, a luminance histogram including frequencies indicating numbers of pixels for respective luminance values;

a second generation unit configured to generate a second luminance histogram by applying weights according to luminance values to the luminance histogram;

a setting unit configured to analyze a histogram shape using the second luminance histogram, and to set weight values for respective mountain-shaped distributions in the second luminance histogram; and an acquisition unit configured to acquire a feature amount for the tone correction by applying the weight values set by the setting unit to one of the luminance histogram and the second luminance histogram.

Further features of the present invention will become apparent from the following description of exemplary embodiments with reference to the attached drawings.

BRIEF DESCRIPTION OF THE DRAWINGS

FIG. 3 is a flowchart showing tone correction processing of an image according to the embodiment;

FIGS. 7A to 7D are graphs showing examples of calculations of weights for various mountain-shaped distributions;

FIGS. 9A to 9D are graphs showing an example of calculations of weights for mountain-shaped distributions according to the second embodiment;

FIGS. 12A to 12E are graphs showing examples of weights according to luminance values according to the embodiment.

DESCRIPTION OF THE EMBODIMENTS

<First Embodiment>

This embodiment will explain the following image processing apparatus. That is, the image processing apparatus weights a mountain-shaped distribution according to a drop between a maximum frequency (to be expressed as a top peak hereinafter) in the mountain-shaped distribution and a minimum frequency (to be expressed as a bottom peak hereinafter) in the mountain-shaped distribution, which corresponds to each of the two ends of the mountain-shaped distribution in the mountain-shaped distributions of a histogram. Then, the apparatus calculates a feature amount that changes smoothly according to a change in histogram shape by calculating an average of histograms included in the mountain-shaped distributions, and executes tone correction of an image using the feature amount.

Figure 1:
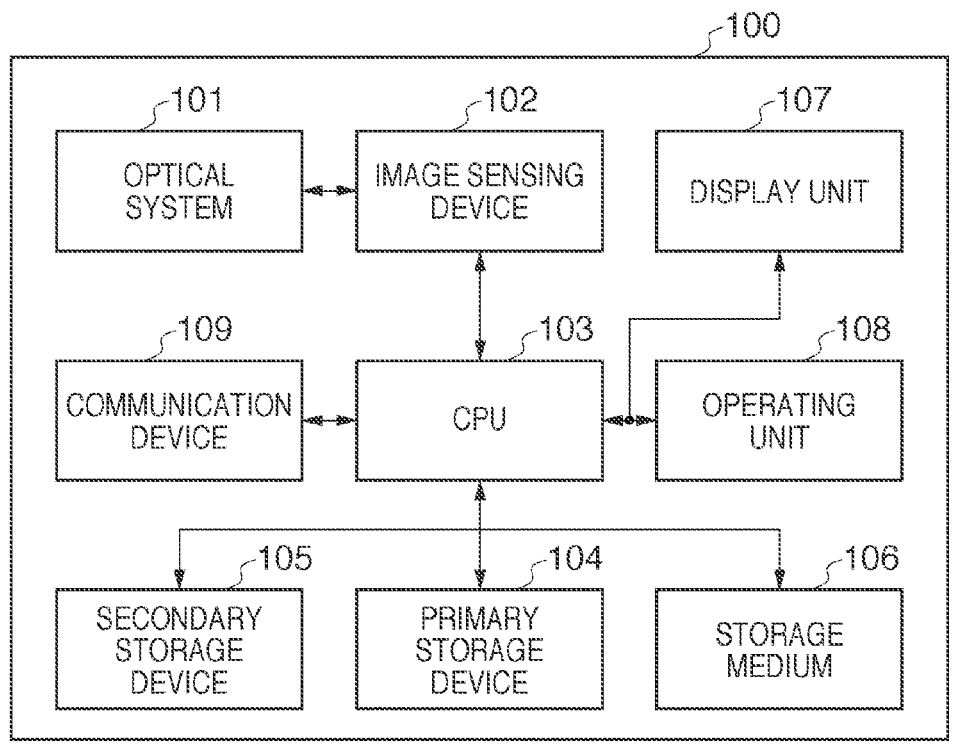
FIG. 1 is a block diagram showing the arrangement of an image sensing apparatus according to an embodiment.

FIG. 1 is a block diagram showing the arrangement of an image sensing apparatus 100 as one embodiment which implements an image processing apparatus of the first embodiment. The image sensing apparatus includes apparatus such as a digital camera and digital video camera, which sense an image of an object to obtain image data. Referring to FIG. 1, an optical system 101 includes a lens, shutter, and stop, and images light coming from an object on an image sensing device 102 to have an appropriate light amount and timing. The image sensing device 102 converts light imaged via the optical system 101 into an image. A CPU 103 controls various arithmetic operations and respective components that form the image sensing apparatus 100 according to input signals and programs.

A primary storage device 104 temporarily stores data, and is used as a work area of the CPU 103. A secondary storage device 105 stores programs (firmware) and various kinds of setting information required to control the image sensing apparatus 100. A storage medium 106 stores sensed image data and the like. Note that the storage medium 106 can be detached after images are sensed, and can be attached to, for example, a personal computer (PC) so as to read out data. That is, the image sensing apparatus 100 need only have an access function to the storage medium 106 so as to read and write data from and in the storage medium 106. A display unit 107 displays a viewfinder image at the time of image sensing, a sensed image, and characters for interactive operations. An operating unit 108 accepts user's operations. The operating unit 108 can use, for example, buttons, levers, a touch panel, and the like.

A communication device 109 is connected to an external apparatus to exchange control commands and data. As a protocol required to establish connection and to make data communications, for example, a PTP (Picture Transfer Protocol) is used. Note that the communication device 109 may make communications by a wired connection using, for example, a USB (Universal Serial Bus) cable. Alternatively, the communication device 109 may make communications by a wireless connection such as a wireless LAN. The communication device 109 may be connected to an external apparatus directly or via a server or a network such as the Internet.

Figure 2:
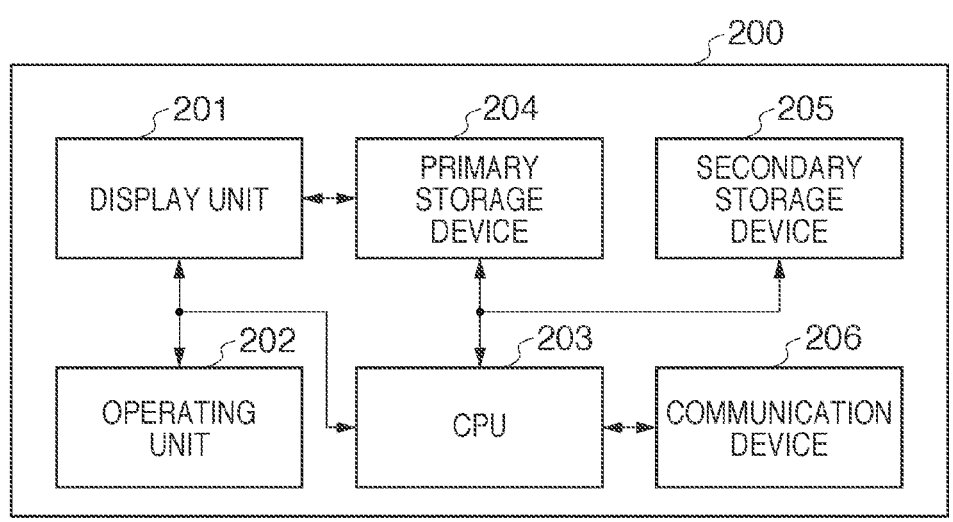
FIG. 2 is a block diagram showing the arrangement of an information processing apparatus according to the embodiment.

FIG. 2 is a block diagram showing the arrangement of an information processing apparatus 200 as another embodiment which implements the image processing apparatus of the first embodiment. Referring to FIG. 2, a display unit 201 displays an image before image processing, that after the image processing, and characters for interactive operations. An operating unit 202 accepts user's operations. The operating unit 202 can use, for example, a keyboard and pointing device. A CPU 203 controls various arithmetic operations and respective components that form the information processing apparatus 200 according to input signals and programs. A primary storage device 204 temporarily stores data, and is used as a work area of the CPU 203. A secondary storage device 205 stores programs and various setting information required to execute image processing. A communication device 206 is connected to an external apparatus to exchange control commands and data. As a mode of the communication device 206, the same mode as the communication device 109 can be selected.

FIG. 3 is a flowchart showing the sequence of processing for correcting luminance tone values of an image according to this embodiment. The overall processing sequence is common to the first and second embodiments. However, the first embodiment calculates a feature amount of a dark part by calculating an average of mountain-shaped distributions from the dark part, while the second embodiment calculates a feature amount of a bright part by calculating a weighted average of mountain-shaped distributions from the bright part. The first embodiment, which calculates a feature amount of a dark part in an image from mountain-shaped distributions of a histogram, and executes tone correction, will be described below using FIG. 3. Note that luminance tone correction processing for an image sensed by the image sensing apparatus 100 will be described below. However, as will be understood from the following description, the information processing apparatus 200 can similarly execute the processing for general image data (which is not limited to a sensed image).

After an image is sensed via the optical system 101 and image sensing device 102 in step S301, the CPU 103 generates a luminance histogram for the obtained image in step S302. Note that an image stored in the storage medium may be read out as an object to be processed. Upon implementing this processing in the information processing apparatus 200, an image stored in the secondary storage device 205 or that acquired via the communication device 206 may be used as an object to be processed.

This embodiment calculates an 8-bit luminance signal Y obtained by converting 8-bit R, G, and B signals using a conversion formula which is defined in sRGB and is given by:

$$Y = 0.299R + 0.587G + 0.114B \quad (1)$$

and generates a luminance histogram which represents frequencies of luminance values. That is, a luminance histogram defined by arranging frequencies each as the number of pixels for each luminance signal Y calculated by the above equation in an order of luminance values from a low-luminance side as a first side to a high-luminance side as a second side is generated.

Figure 4A:
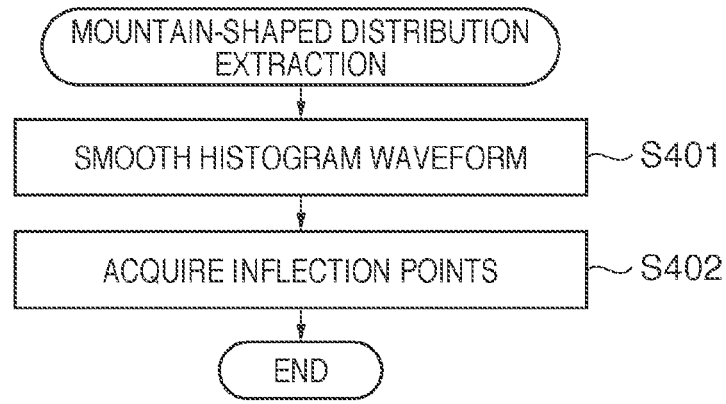
FIGS. 4A to 4C are flowcharts and graphs for explaining mountain-shaped distribution extraction processing according to the embodiment.
Figure 4B:
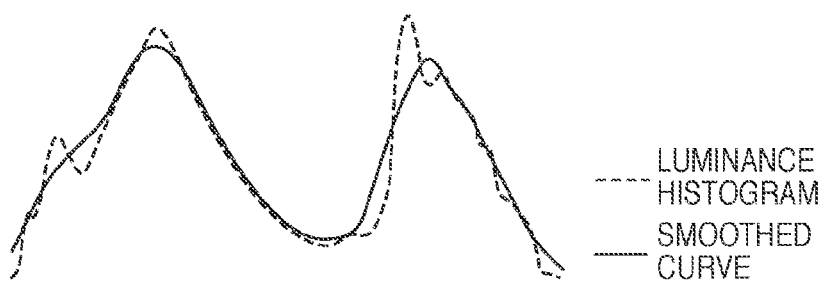

In step S303, the CPU 103 extracts mountain-shaped distributions from the luminance histogram generated in step S302. Extraction of the mountain-shaped distributions will be described below using FIGS. 4A to 4C. The shape of a luminance histogram finely varies depending on objects included in an image, as shown in FIG. 4B. For this reason, in order to extract mountain-shaped distributions more stably, processing for removing such fine variations is required. Hence, in mountain-shaped distribution extraction processing, the CPU 103 executes smoothing processing of a luminance histogram waveform in step S401 in FIG. 4A, thereby obtaining a smoothed curve shown in FIG. 4B.

In order to obtain the smoothed curve shown in FIG. 4B, this embodiment executes smoothing by so-called 31-point simple moving average processing which calculates average values of the frequency of each luminance of interest and those of 15 levels higher and lower than the luminance of interest. In this case, since the luminance signal Y is an 8-bit signal, it has only a value ranging from 0 to 255, and when a luminance value is equal to or lower than "14" or is equal to or higher than "241", a frequency at a luminance value which does not have any information of the luminance histogram has to be referred to. Hence, in this embodiment, the frequency at the luminance value which does not have any information of the luminance histogram is calculated as "0" to calculate a simple moving average in such case. However, in addition to this method, the luminance histogram can be smoothed using only frequencies at luminance values each of which has information of the luminance histogram, needless to say. This embodiment adopts the 31-point simple moving average processing. Alternatively, a range may be set to include points other than 31 points, or simple moving average processing may be repetitively applied to a smoothed histogram that has undergone the simple moving average processing, thereby smoothing the luminance histogram. Also, in order to remove the influences of highlight- and shadow-detail losses, frequencies at luminance values outside a certain luminance range of a luminance histogram may be calculated as "0".

Figure 4C:
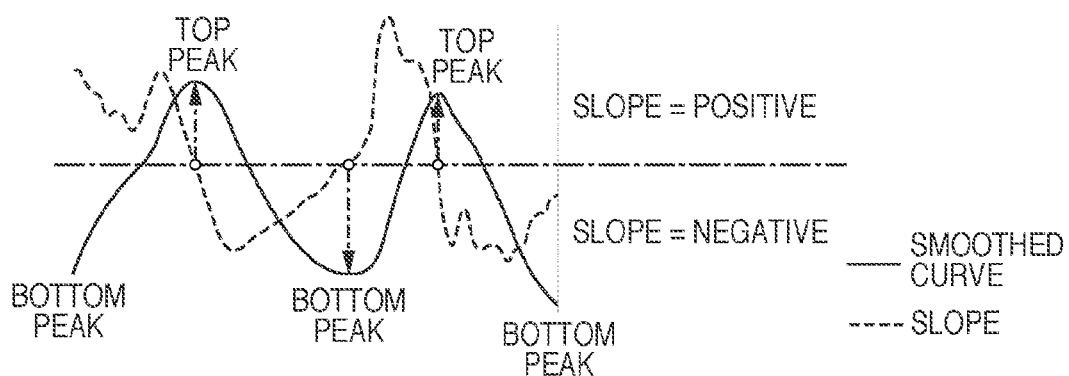

In order to extract mountain-shaped distributions from the smoothed curve obtained in step S401, the CPU 103 acquires inflection points in step S402. In this embodiment, a slope of the smoothed curve shown in FIG. 4C is calculated by calculating a difference between the frequency of the luminance of interest and that of a luminance one luminance level higher than the luminance of interest. As for this slope, a part where the slope changes from positive to negative, that is, an upward convex part in the frequency distribution of the histogram will be referred to as a top peak, and a part where the slope changes from negative to positive, that is, a downward convex part will be referred to as a bottom peak. By dividing the luminance histogram by the bottom peaks, a plurality of partial histograms are generated. That is, partial histograms sandwiched between neighboring bottom peaks are extracted. Each partial histogram sandwiched between bottom peaks generally has a mountain shape, and will also be referred to as a mountain-shaped distribution hereinafter. When the luminance signal Y is handled as an 8-bit signal, 0 and 255 levels are also extracted as bottom peaks.

After the mountain-shaped distributions are extracted in this way in step S303 in FIG. 3, the CPU 103 calculates weights to be given to the respective mountain-shaped distributions based on information of the mountain-shaped distributions in step S304. This weight calculation is executed based on the concept that letting a frequency be a height of a mountain, upon scanning a mountain from the dark part side, a part which ascends by a predetermined height of a mountain or more and then descends by a predetermined height or more is assumed as a mountain. For example, when the first top peak from a dark part is very low, a feature of the dark part in that scene lies in a mountain-shaped distribution on the brighter part side. Even when the first top peak is very high, if another top peak appears with nearly no decline from there, it can be considered that many features of a dark part in that scene are included not only in the first top peak but also in the second top peak. This embodiment calculates weights that adequately reflect such technical scope so as to apply appropriate tone correction.

An overview of weight calculation processing according to this embodiment will be described first in turn using FIGS. 5A to 5D. After that, the weight calculation processing will be described in detail using the flowchart shown in FIG. 6. Note that FIGS. 5A to 5D illustrate a state in which three mountain-shaped distributions are obtained, and will be referred to as mountain-shaped distributions 1, 2, and 3 in turn from that of a dark part.

Figure 5B:
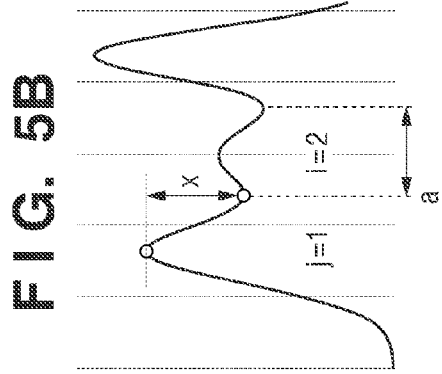
FIGS. 5A to 5D are graphs showing an example of calculations of weights for mountain-shaped distributions according to the first embodiment.
Figure 6:
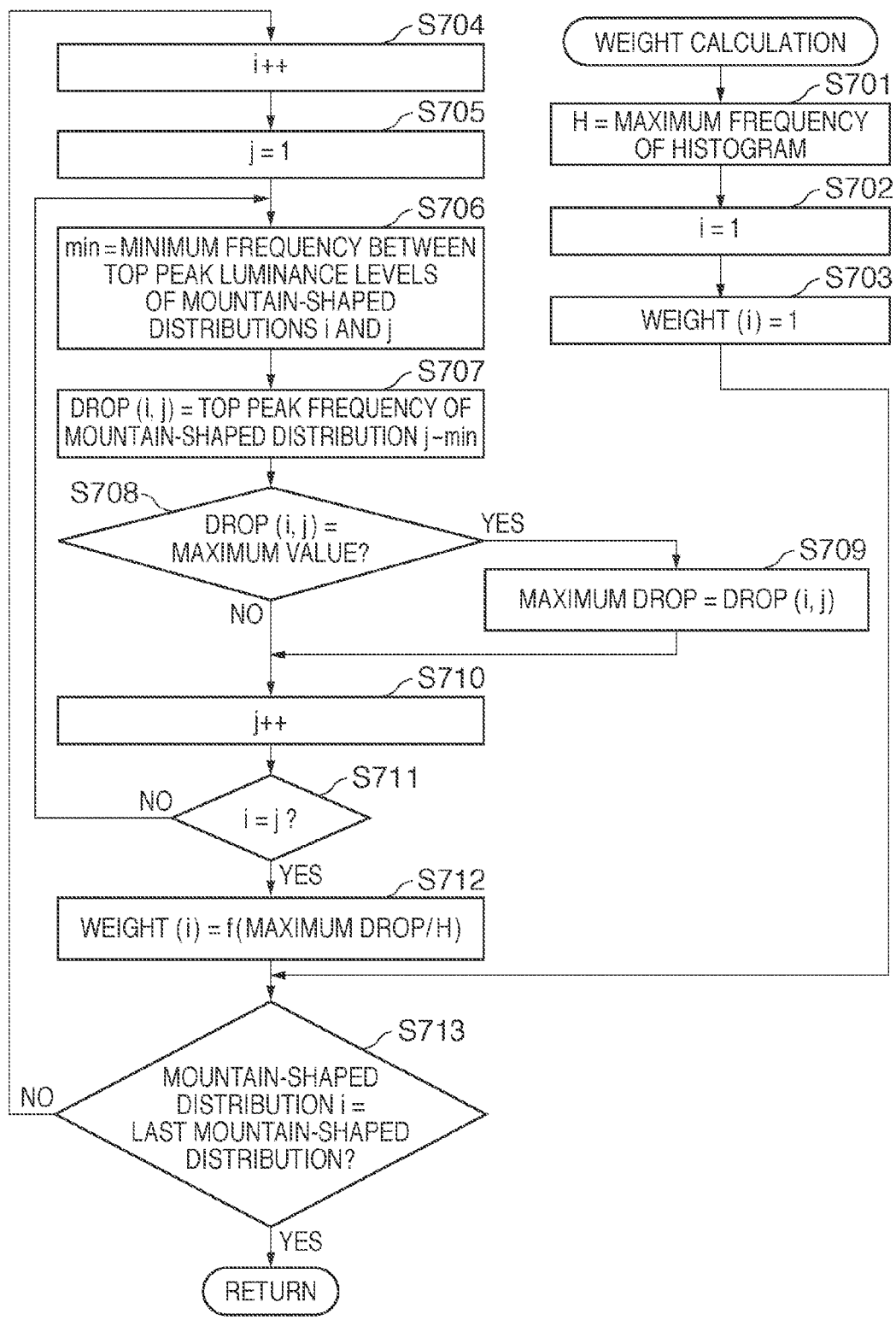
FIG. 6 is a flowchart showing weight calculation processing according to the first embodiment.

Mountain-shaped distribution 1 on the lowest-luminance side is assigned a maximum weight value (weight=1.0 in this example), since it is the first mountain. Upon calculating a weight for next mountain-shaped distribution 2, a frequency of luminance a as a minimum frequency within a luminance range (bottom peak) between a luminance corresponding to a top peak of mountain-shaped distribution 1 and that corresponding to a top peak of mountain-shaped distribution 2 is calculated, as shown in FIG. 5B. Then, a difference x between the frequency of the top peak of mountain-shaped distribution 1 and that of luminance a is calculated. Since the weight for mountain-shaped distribution 2 is calculated from a drop until this mountain-shaped distribution 2 is reached, the calculation of the drop with respect to mountain-shaped distribution 2 ends here, and the weight for mountain-shaped distribution 2 is calculated based on a ratio of x with respect to a maximum drop of the entire luminance histogram.

Figure 5D:
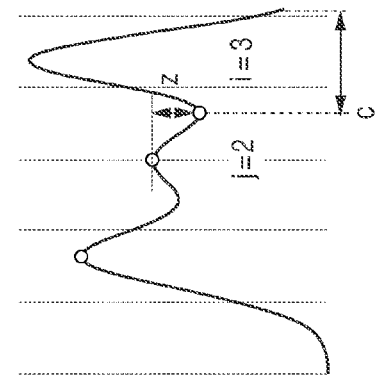
Figure 5A:
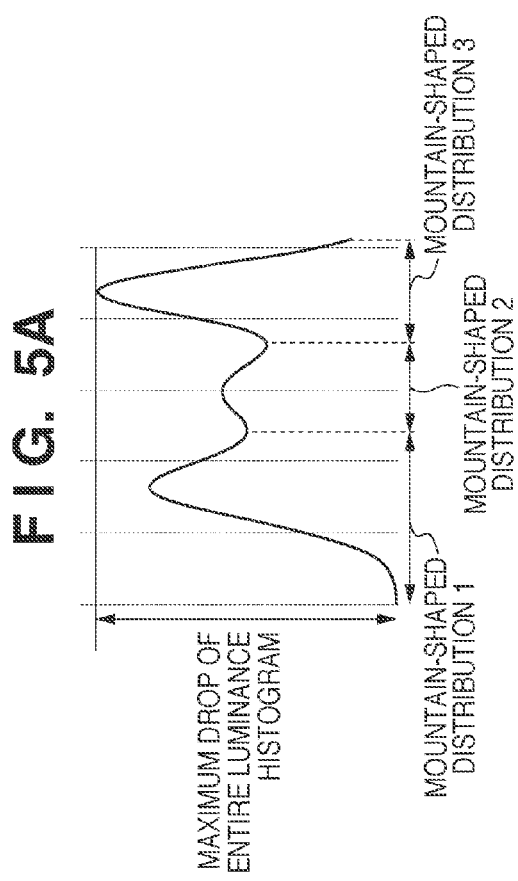
Figure 5C:
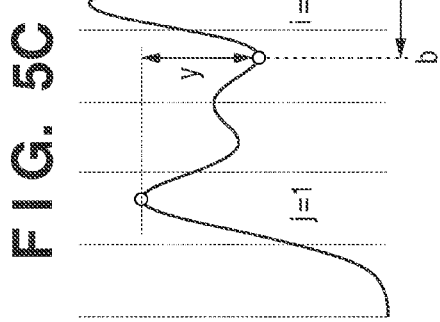

Upon calculating a weight for next mountain-shaped distribution 3, a frequency of luminance b as a minimum frequency within a luminance range between the luminance corresponding to the top peak of mountain-shaped distribution 1 and that corresponding to a top peak of mountain-shaped distribution 3 is calculated, as shown in FIG. 5C. Then, a difference y between the frequency of the top peak of mountain-shaped distribution 1 and that of luminance b is calculated. Although the weight for mountain-shaped distribution 3 is calculated from a drop until this mountain-shaped distribution 3 is reached, since mountain-shaped distribution 2 exists before mountain-shaped distribution 3 is reached in addition to mountain-shaped distribution 1, processing associated with mountain-shaped distribution 2 is further executed. As shown in FIG. 5D, a frequency of luminance c as a minimum frequency between the top peaks of mountain-shaped distributions 2 and 3 is calculated. Then, a difference z between the frequency of the top peak of mountain-shaped distribution 2 and that of luminance c is calculated. In this case, the luminance having the minimum frequency within the luminance range between the luminance of the top peak of mountain-shaped distribution 3 and that of the top peak of mountain-shaped distribution 1 is equal to the luminance having the minimum frequency within the luminance range between the luminance of the top peak of mountain-shaped distribution 3 and that of the top peak of mountain-shaped distribution 2. For this reason, luminance b in FIG. 5C and luminance c in FIG. 5D indicate the same luminance.

Of the calculated differences y and z, the larger difference y is selected, and is used as a drop until mountain-shaped distribution 3 is reached. Using the drop y calculated in this way, the weight for mountain-shaped distribution 3 is calculated based on a ratio of y with respect to the maximum drop of the entire luminance histogram. Note that since the luminance histogram in FIGS. 5A to 5D includes only three mountain-shaped distributions, the processing ends here, thereby calculating the weights respectively for the three mountain-shaped distributions.

An example for implementing the aforementioned weight calculations on a program will be described below using FIGS. 5A to 5D and FIG. 6. In order to obtain the maximum drop of the entire luminance histogram, which is required to calculate weights, the CPU 103 obtains a maximum frequency of the luminance histogram in step S701, and sets it as a maximum drop H of the entire luminance histogram. Note that a difference between maximum and minimum frequencies of the generated luminance histogram may be calculated, and may be set as the maximum drop H of the entire luminance histogram.

In step S702, the CPU 103 initializes a number i of a mountain-shaped distribution to be extracted as a mountain-shaped distribution region to be weighted (partial histogram of interest) for which a weight is to be calculated. In this case, i=1 indicates a mountain-shaped distribution located on the most dark part side, and i is incremented like i=2 and i=3 toward a brighter part side. A mountain-shaped distribution indicated by the number i will be referred to as a partial histogram of interest, and a weight value for the partial histogram of interest is determined. By incrementing i, weight values for all mountain-shaped distributions are set. Since the weight for the mountain-shaped distribution located on the lowest-luminance side is handled as "1.0", a weight=1.0 is set in step S703, and the process advances to step S713.

The CPU 103 checks in step S713 if mountain-shaped distribution i is the last mountain-shaped distribution. If only one mountain-shaped distribution is found on the luminance histogram, the processing ends. On the other hand, if two or more mountain-shaped distributions exist, as in the example of FIG. 5A, the process advances to step S704. The CPU 103 increments the number i of the mountain-shaped distribution region to be weighted in step S704, and initializes a number j of a mountain-shaped distribution, for which a drop is to be calculated, in step S705. In this case, j=1 indicates a mountain-shaped distribution located on the most dark part side, and j is incremented like j=2 and j=3 toward a brighter part side. Since a weight for mountain-shaped distribution i is calculated from a drop until that mountain-shaped distribution i is reached, mountain-shaped distribution j targets at a mountain on a darker part side than mountain-shaped distribution i, and j<i always holds.

In step S706, the CPU 103 calculates a minimum frequency min between a luminance of a top peak of mountain-shaped distribution i and that of a top peak of mountain-shaped distribution j. Then, when (i, j)=(2, 1), the frequency of luminance a in FIG. 5B is calculated, and is set as the minimum frequency min. On the other hand, when (i, j)=(3, 1), the frequency of luminance b in FIG. 5C is calculated as the minimum frequency min. Also, when (i, j)=(3, 2), the frequency of luminance c in FIG. 5D is calculated as the minimum frequency min.

As for the minimum frequency min calculated in this way, the CPU 103 sets a difference obtained by subtracting the frequency min from the frequency of the top peak of mountain-shaped distribution j as a drop (i, j) from mountain-shaped distribution j to mountain-shaped distribution i in step S707. As in the above case, when (i, j)=(2, 1), the difference x in FIG. 5B is calculated as the drop (i, j) from mountain-shaped distribution j to mountain-shaped distribution i. On the other hand, when (i, j)=(3, 1), the difference y in FIG. 5C is calculated as the drop (i, j). Also, when (i, j)=(3, 2), the difference z in FIG. 5D is calculated as the drop (i, j).

After the drop (i, j) is calculated, as described above, the CPU 103 updates the maximum drop in steps S708 and S709. This maximum drop is calculated for each mountain-shaped distribution i. For example, when i=2, since only the difference x in FIG. 5B is calculated, that difference x is set as the maximum drop. When i=3, the difference y in FIG. 5C and difference z in FIG. 5D are calculated, and the larger difference y is calculated as the maximum drop. In this way, the CPU 103 calculates drops (i, j) for all mountain-shaped distributions located on the lower-luminance side than mountain-shaped distribution i for which a weight is to be calculated, and calculates the maximum drops from these drops. For this reason, while j<i as a result of incrementing j in step S710, the processes in steps S706 to S709 are repeated (step S711).

Figure 8A:
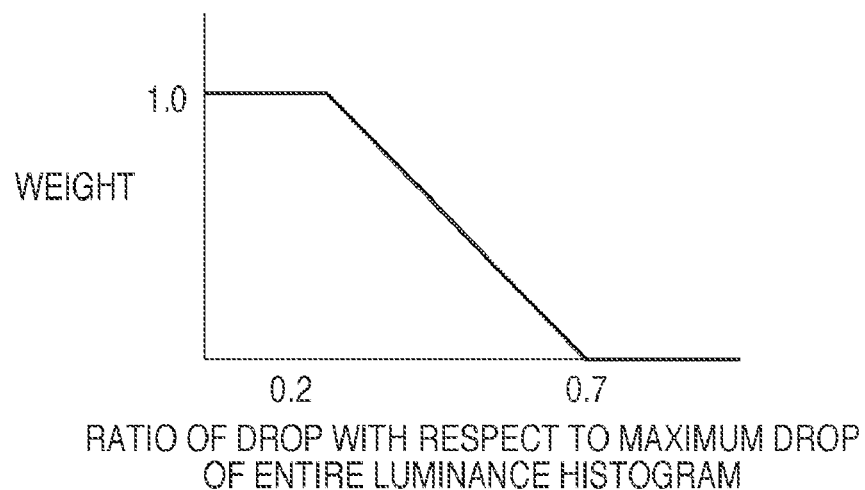
FIG. 8A is a graph showing an example of calculations of weights associated with the weight calculation processing.

In step S712, the CPU 103 calculates a weight (i) of mountain-shaped distribution i based on the maximum drop calculated in this way. In this embodiment, the weight (i) of mountain-shaped distribution i is calculated based on a ratio of the maximum drop with respect to the maximum drop H of the entire histogram. Upon calculating the weight, for example, when the ratio of the drop of mountain-shaped distribution i with respect to the maximum drop of the entire luminance histogram is equal to or smaller than a first threshold, a weight is set to be 1.0; when the ratio of the drop of mountain-shaped distribution i is equal to or larger than a second threshold, a weight is set to be 0.0, and the weight can be decreased between these values. For example, FIG. 8A shows an example of weight calculations. In this example, when the ratio of the drop of mountain-shaped distribution i with respect to the maximum drop of the entire luminance histogram is equal to or smaller than a threshold=0.2, a weight is set to be 1.0; when the ratio of the drop of mountain-shaped distribution i is equal to or larger than a threshold=0.7, a weight is set to be 0.0, and the weight is linearly decreased between these values. This embodiment uses the weight value shown in FIG. 8A. Alternatively, the exemplified thresholds may be changed, or a decreasing degree of the weight may be changed to nonlinear. Furthermore, the user may set these changes.

As described above, upon calculating the weight, a luminance range from a luminance corresponding to a maximum frequency in one partial histogram, which is located on a lower-luminance side than a partial histogram of interest of a plurality of partial histograms, to that corresponding to a maximum frequency of the partial histogram of interest is specified. Then, a difference between the maximum frequency of the one partial histogram and a minimum frequency included in the luminance range is calculated as a drop candidate. Such drop candidates are calculated for all partial histograms located on the lower-luminance side than the partial histogram of interest, and a maximum one of the obtained drop candidates is determined as a drop of the partial histogram of interest. Next, the CPU 103 calculates a feature amount of a luminance histogram shape in step S305 using the weights calculated in step S304 in FIG. 3. In this embodiment, upon calculation of a feature amount, frequencies of luminance levels included in respective mountain-shaped distributions are weighted and added, and the weighted sum is then averaged to calculate an average luminance of a dark part included in an image, thus determining that average luminance as a feature amount. For this reason, in this embodiment, a feature amount is calculated by:

$$\frac{\sum_{i=1}^{M} \sum_{k=m_{iL}+1}^{m_{iR}} kf(k)r(i)}{\sum_{i=1}^{M} \sum_{k=m_{iL}+1}^{m_{iR}} f(k)r(i)} \quad (2)$$

where M is the number of mountain-shaped distributions, $m_{iL}$ is a luminance of a bottom peak on the low-luminance side of mountain-shaped distribution i, $m_{iR}$ is a luminance of a bottom peak on the high-luminance side of mountain-shaped distribution i, f(k) is a frequency at luminance k, and r(i) is a weight for mountain-shaped distribution i.

Using the luminance obtained by the weighted average processing as a feature amount of a dark part, a table for tone conversion is updated. This point will be described later, and the effects of this embodiment in various mountain-shaped distributions, that is, examples that allow calculations of appropriate feature amounts independently of histogram shapes will be described below with reference to FIGS. 7A to 7D.

(1) When Mountain-shaped Distribution with Low Height is Detected

A case will be examined below wherein mountain-shaped distribution x with a low height is included, as shown in FIG. 7A. For example, when a mountain-shaped distribution having a height smaller than a given threshold is ignored, a result largely changes depending on whether or not mountain-shaped distribution x is ignored in an image having mountain-shaped distribution x around that threshold. When this embodiment is applied to such luminance histogram, a drop used to calculate a weight for mountain-shaped distribution y in FIG. 7A is h in FIG. 7A. In this case, when mountain-shaped distribution x is sufficiently low, the drop h becomes small, and a weight for mountain-shaped distribution y is close to 1.0 even when mountain-shaped distribution x is not determined as a mountain-shaped distribution. When an area occupied by an object having luminance values included in mountain-shaped distribution x in a frame is gradually increased, since the height for mountain-shaped distribution x gradually rises, the drop h is also gradually increased. Since the weight for mountain-shaped distribution y is decreased little by little accordingly, a feature amount which gradually changes according to a change in luminance histogram can be calculated.

(2) When Two or More Mountain-shaped Distributions are Coupled

A case will be examined below wherein two mountain-shaped distributions are coupled to form one mountain-shaped distribution, as shown in FIG. 7B. In such case, when a mountain-shaped distribution is to be separated into two mountain-shaped distributions if a feature amount calculated from, for example, average values, variance values, or frequencies near a boundary is equal to or larger than a certain threshold, the processing result largely changes around that threshold. Hence, when this embodiment is applied to such luminance histogram, a drop used to calculate a weight for mountain-shaped distribution y in FIG. 7B is h in FIG. 7B. In this case, when two mountain-shaped distributions are sufficiently close to each other, the drop h becomes small, and a weight for mountain-shaped distribution y is close to 1.0. On the other hand, when mountain-shaped distribution x is gradually separated away from mountain-shaped distribution y, or when the height of mountain-shaped distribution x gradually rises, the drop h is also gradually increased. According to this embodiment, since the weight for mountain-shaped distribution y is decreased little by little accordingly, a feature amount which gradually changes according to a change in luminance histogram can be calculated.

(3) When Small Bottom Peak Exists Near Top Peak of Mountain-shaped Distribution

When a bottom peak exists in a certain mountain-shaped distribution, as shown in FIG. 7C, and when, for example, a part with a decline larger than a certain threshold is determined as a bottom peak, the result largely changes around that threshold. Hence, when this embodiment is applied to such luminance histogram, a drop used to calculate a weight for mountain-shaped distribution y in FIG. 7C is h in FIG. 7C. When a bottom peak, which exists near the top peak of the mountain-shaped distribution is sufficiently small, the drop h becomes small, and the weight for mountain-shaped distribution y is close to 1.0. When these mountain-shaped distributions x and y are gradually separated as two mountain-shaped distributions, or when distribution ranges of the two mountain-shaped distributions are gradually narrowed down, a bottom peak sandwiched between the two mountain-shaped distributions becomes gradually deeper, and the drop h is also gradually increased. According to this embodiment, since the weight for mountain-shaped distribution y is decreased little by little accordingly, a feature amount that gradually changes according to a change in luminance histogram can be calculated.

(4) When Many Mountain-shaped Distributions Exist

When a luminance histogram has a complicated shape, and many mountain-shaped distributions are detected, as shown in FIG. 7D, drops between neighboring mountains may often become small. For this reason, if a mountain-shaped distribution is separated into two mountain-shaped distributions when a feature amount calculated from, for example, a drop between neighboring mountain-shaped distributions or frequencies near boundaries is equal to or larger than a certain threshold, it may be determined in the example of FIG. 7D that a mountain continues indefinitely. Hence, when this embodiment is applied to such luminance histogram, a drop used to calculate a weight for mountain-shaped distribution x in FIG. 7D is calculated as h1 in FIG. 7D. As in the example of FIG. 7D, when this drop h1 is sufficiently small, the weight for mountain-shaped distribution x is close to 1.0. When a drop used to calculate a weight for mountain-shaped distribution y is calculated based on this drop, it is h2 in FIG. 7D. Then, in the example of FIG. 7D, since the drop is large, the weight for mountain-shaped distribution y is close to 0.0.

As described above, the feature amount calculation unit of this embodiment can calculate feature amounts more suited to histograms having various shapes.

Figure 8B:
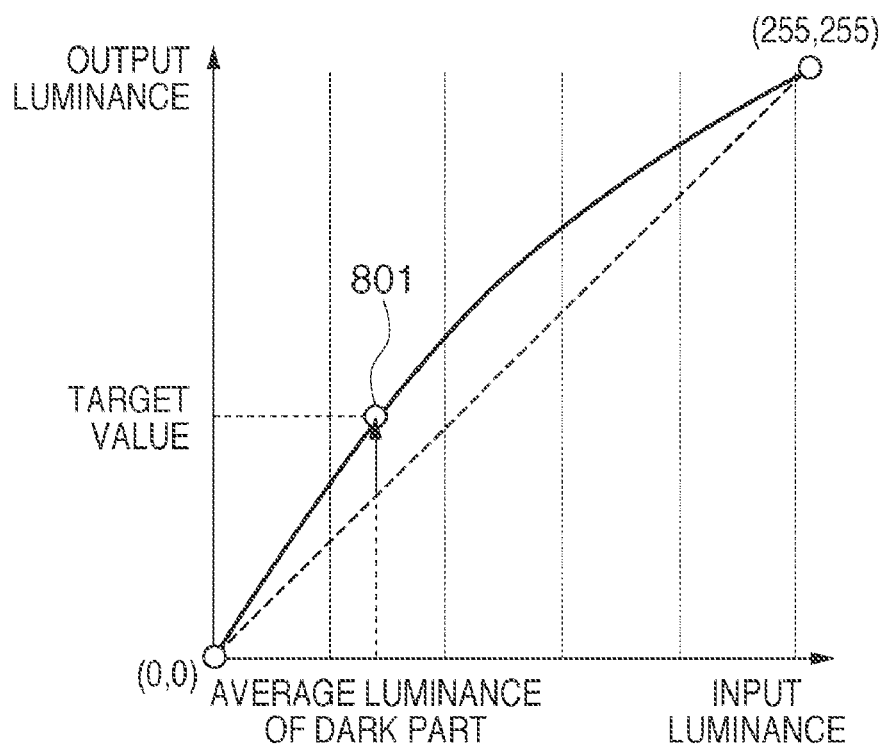
FIG. 8B is a graph showing an example associated with generation of a correction table.

Next, the CPU 103 generates a correction table in step S306 based on the feature amount calculated in step S305 in FIG. 3. In this embodiment, an image is corrected using a spline-interpolated curve shown in FIG. 8B as a tone conversion curve. In this embodiment, a target value according to the feature amount obtained in step S305 is defined in advance, and spline interpolation is made to have a point 801 defined by that feature amount and target value, point (0, 0), and point (255, 255) as control points, thereby calculating a correction curve. In this case, by adding another control point to the high-luminance side, tonality on the high-luminance side may be left unchanged. When another correction (for example, contrast correction) is applied to the entire histogram, a target value may be calculated after the position of the feature amount is adjusted according to that correction, and may be used to define a control point of spline interpolation. For example, when contrast correction is made to broaden a histogram toward the brighter part side, the feature amount calculated from the histogram before the contrast correction is also pulled toward the brightness part side. Also, for example, a target value y may be calculated from a feature amount x by y=ax+b (a and b are constants). In this case, the target value is not directly influenced by a contrast adjustment value, and the target value y is changed to y'=ax'+b since the feature amount x is changed to x' by the contrast correction.

In step S307, the CPU 103 applies tone correction to an image using the correction table obtained in step S306. In this manner, an image whose dark part is corrected can be obtained. As described above, since a feature amount is calculated from mountain-shaped distributions of a histogram, a feature of a dark part in an image can be effectively extracted, and a correction amount more suited to that image can be determined. In this embodiment, upon calculation of a feature amount required to determine tone correction characteristics (tone correction curve), the feature amount can be stably calculated even for a histogram having a complicated shape.

<Second Embodiment>

The aforementioned first embodiment has exemplified the case in which mountain-shaped distributions are weighted and added from a low-luminance side as a feature amount of a dark part. Alternatively, when mountain-shaped distributions are weighted and added from a high-luminance side, a feature amount of a bright part can be calculated. The second embodiment will explain processing for calculating a feature amount of a bright part. The second embodiment can be implemented using an image sensing apparatus shown in FIG. 1 or an information processing apparatus shown in FIG. 2 as in the first embodiment. In this case, a luminance histogram in which luminance values are arranged in an order of luminance values in turn to have a high-luminance side as a first side and a low-luminance side as a second side is generated, and mountain-shaped distributions are selected in turn from the first side to determine weights. Therefore, details of this processing are apparent to those who are skilled in the art from the description of the first embodiment. Tone correction characteristics may be changed by solely using the feature amount of the bright part obtained in this way, but they may be changed using the feature amount together with that of a dark part calculated in the first embodiment. This embodiment will explain a case in which the tone correction characteristics are changed using two feature amounts. That is, in this embodiment, a feature amount of a dark part is calculated from a luminance histogram generated in step S302, as described in the first embodiment, and a feature amount of a bright part is also calculated from that luminance histogram. Therefore, in the second embodiment, in addition to the feature amount calculation processing described in the first embodiment, processes in steps S304 and 5305 are executed by assigning i=1, 2, and 3 and j=1, 2, and 3 in turn from a higher-luminance side of the luminance histogram.

An overview of calculation processing of weights for respective mountain-shaped distributions upon calculation of a feature amount of a bright part will be explained in turn using FIGS. 9A to 9D. In FIG. 9A, mountain-shaped distributions 1, 2, and 3 are defined in turn from that of a bright part. Mountain-shaped distribution 1 on the highest-luminance side is set to have a weight=1.0 since it is the first mountain. Upon calculating a weight for next mountain-shaped distribution 2, a frequency of luminance a as a minimum frequency between top peaks of mountain-shaped distributions 1 and 2 is calculated, as shown in FIG. 9B. Then, a difference x between the frequency of the top peak of mountain-shaped distribution 1 and that of luminance a is calculated.

Since the weight for mountain-shaped distribution 2 is calculated from a drop until this mountain-shaped distribution 2 is reached, the calculation of a drop for mountain-shaped distribution 2 ends here, and the weight for mountain-shaped distribution 2 is calculated based on a ratio of x with respect to a maximum drop of the entire luminance histogram.

Upon calculating a weight for next mountain-shaped distribution 3, a frequency of luminance b as a minimum frequency between the top peaks of mountain-shaped distributions 1 and 3 is calculated, as shown in FIG. 9C. Then, a difference y between the frequency of the top peak of mountain-shaped distribution 1 and that of luminance b is calculated. Although the weight for mountain-shaped distribution 3 is calculated from a drop until this mountain-shaped distribution 3 is reached, since mountain-shaped distribution 2 exists before mountain-shaped distribution 3 is reached in addition to mountain-shaped distribution 1, processing associated with mountain-shaped distribution 2 is further executed. As shown in FIG. 9D, a frequency of luminance c as a minimum frequency between the top peaks of mountain-shaped distributions 2 and 3 is calculated. Then, a difference z between the frequency of the top peak of mountain-shaped distribution 2 and that of luminance c is calculated. Of the calculated differences y and z, the larger difference y is selected, and is used as a drop until mountain-shaped distribution 3 is reached. Using the drop y calculated in this way, the weight for mountain-shaped distribution 3 is calculated based on a ratio of y with respect to the maximum drop of the entire luminance histogram.

Since the luminance histogram in FIGS. 9A to 9D includes only three mountain-shaped distributions, the processing ends here, thereby calculating the weights respectively for the three mountain-shaped distributions.

In this embodiment, upon calculating a feature amount, frequencies of luminance levels included in respective mountain-shaped distributions are weighted and added from the high-luminance side, and the weighted sum is then averaged to calculate an average luminance of a bright part included in an image, thus determining the average luminance as a feature amount. For this reason, in this embodiment, a feature amount of a bright part is calculated by:

$$\frac{\sum_{i=1}^{M} \sum_{k=m_{iR}}^{m_{iL}+1} kf(k)r(i)}{\sum_{i=1}^{M} \sum_{k=m_{iR}}^{m_{iL}+1} f(k)r(i)} \quad (3)$$

where M is the number of mountain-shaped distributions, $m_{iL}$ is a luminance of a bottom peak on the low-luminance side of mountain-shaped distribution i, $m_{iR}$ is a luminance of a bottom peak on the high-luminance side of mountain-shaped distribution i, f(k) is a frequency at luminance k, and r(i) is a weight for mountain-shaped distribution i. In this manner, a feature amount of a bright part in an image can be extracted.

As described in the first embodiment, when correction is applied using a spline curve generated from only control points of a dark part, tonality of a bright part may often be lost. By contrast, according to the second embodiment, a feature amount of a bright part is calculated from mountain-shaped distributions of a histogram, and a control point of spline interpolation is added using the feature amount of the bright part, thus relaxing losses of tonality of the bright part.

<Third Embodiment>

Upon analyzing a histogram, JPB3772133 equivalently handles frequencies of all luminance levels. However, for example, in a scene including a large area of uniform blue sky, since a histogram is concentrated on a limited region of a high-luminance part, if frequencies of all luminance levels are equivalently handled, the influence of the histogram concentrated range on analysis becomes unnecessarily large. For this reason, a feature amount suited to such scene cannot be calculated. On the other hand, JPB4018524 is effective to apply correction suited to a specific object such as a human face, since frequencies of luminance values of that object are emphasized. However, JPB4018524 cannot apply suited correction in a scene like a backlight scene in which luminance levels of a region to be corrected are distributed over a broad range.

The third embodiment adopts the same method as in the first embodiment as a histogram shape analysis method. That is, mountain-shaped distributions are extracted from a histogram, and a feature amount of a scene is calculated using weights calculated based on drops between top and bottom peaks of the mountain-shaped distributions as criteria. However, in the third embodiment, the weight calculation uses a second luminance histogram, which is generated by weighting a histogram according to luminance levels. That is, histogram shape analysis and tone correction of an image are executed based on the second luminance histogram.

The arrangement of an image sensing apparatus or information processing apparatus as an image processing apparatus according to the third embodiment is the same as that (FIG. 1 or 2) of the first embodiment.

Figure 10:
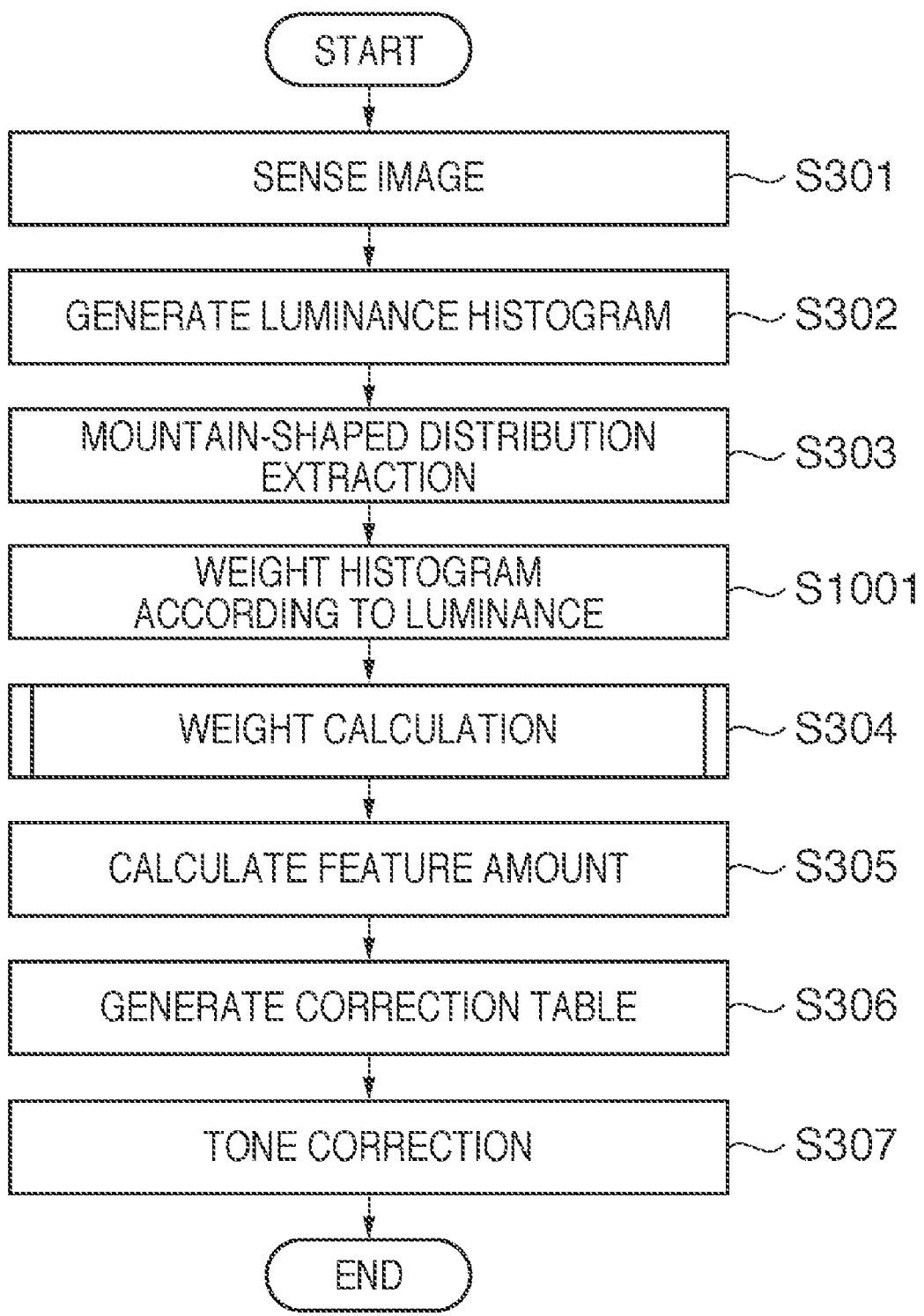
FIG. 10 is a flowchart showing tone correction processing of an image according to the third embodiment.

FIG. 10 is a flowchart showing the sequence of processing for correcting luminance tone values of an image according to the third embodiment. The overall processing sequence is common to respective embodiments. However, the third embodiment calculates a weight for each mountain-shaped distribution in step S1001 to have a drop between top and bottom peaks of mountain-shaped distributions as a criterion. The processing of the third embodiment, which extracts mountain-shaped distributions from a histogram, and calculates a feature amount of a scene using weights based on drops between top and bottom peaks of the mountain-shaped distributions as criteria, will be described below using FIG. 10. Note that luminance tone correction processing for an image sensed by an image sensing apparatus 100 will be described below. However, as will be understood from the following description, an information processing apparatus 200 can similarly execute the processing for general image data (which is not limited to a sensed image).

As in the first embodiment, an image is sensed, its luminance histogram is generated (first generation processing), and mountain-shaped distributions are extracted from the luminance histogram in steps S301 to 5303. Upon extracting the mountain-shaped distributions, as described above, the following method may be used. For example, after the histogram is smoothed by a smoothing method such as moving averaging, each upward convex part at each inflection point of a smoothed curve is defined as a top peak of the histogram, and a downward convex part is defined as a bottom peak of the histogram. Then, a part from a certain bottom peak to the next bottom peak is extracted as a mountain-shaped distribution. For example, in a smoothed curve shown in FIG. 11A, three mountain-shaped distributions can be confirmed.

Figure 11A:
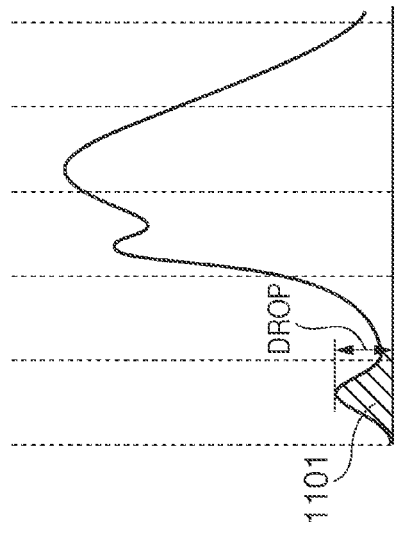
FIGS. 11A to 11D are graphs showing examples of drops in mountain-shaped distributions of various types according to the third embodiment.

The mountain-shaped distributions shown in FIG. 11A may include, in addition to a mountain-shaped distribution 1103 (FIG. 11D) formed by a mass of a principal object in a certain scene, for example, a mountain-shaped distribution 1101 (FIG. 11B) formed by a mass of objects which have a small area occupied in an image and have a small influence on the scene, and a mountain-shaped distribution 1102 (FIG. 11C) generated from luminance information of fine shape parts of the object.

Upon calculating a feature amount of that scene, it is desired to calculate the feature amount from the mountain-shaped distribution formed by the mass of the principal object. However, when the plurality of the aforementioned mountain-shaped distributions are not distinguished from each other, a feature amount may be calculated from the mountain-shaped distribution 1101 having a small influence on the scene, as shown in FIG. 11B, or a feature amount may be calculated from the mountain-shaped distribution 1102 including only the part of FIG. 11C of the mass of the principal object that forms FIG. 11D.

A measure taken against such problems corresponds to the processing in step S304 described in the first embodiment. In FIG. 10, before the processing in step S304, step S1001 of executing second generation processing for generating the aforementioned second luminance histogram is inserted. However, in this case, step S304 will be described first for the sake of descriptive convenience.

In step S304, a CPU 103 calculates weights based on drops between top and bottom peaks of mountain-shaped distributions with respect to the maximum drop of the entire histogram as criteria used upon determining degrees of influence of a plurality of mountain-shaped distributions on a scene. That is, the CPU 103 gives a large weight for a mountain-shaped distribution having a large drop, and sets a small weight for a mountain-shaped distribution having a small drop. This is based on the concept that a mountain-shaped distribution formed by the mass of the principal object is detected when a mountain ascends and descends sufficiently in the shape of a histogram. A drop between top and bottom peaks of a certain mountain-shaped distribution with respect to the maximum drop of the entire histogram is checked.

Figure 11B:
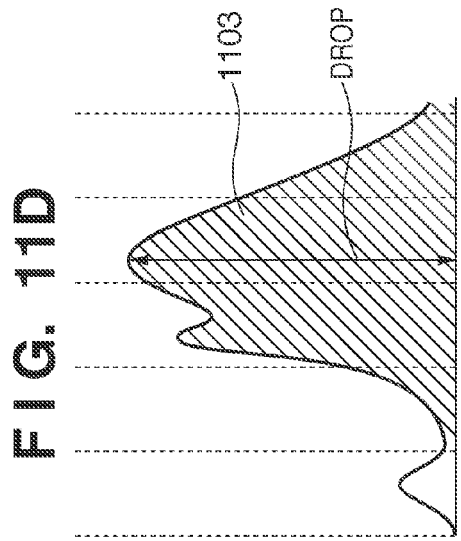
Figure 11C:
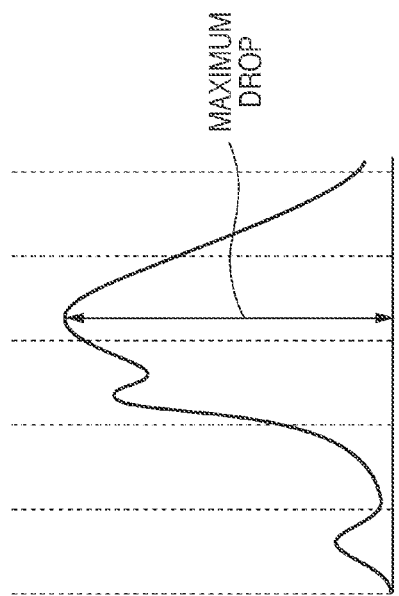

For example, a drop of the mountain-shaped distribution 1101, which has a small area occupied in an image and has a small influence on a scene, as shown in FIG. 11B, is that shown in FIG. 11B. This drop assumes a small value with respect to the maximum drop of the entire histogram shown in FIG. 11A. On the other hand, as shown in FIG. 11C, in case of the mountain-shaped distribution 1102, which is unwantedly separately extracted from the mountain-shaped distribution 1103 in FIG. 11D due to fine shape parts of the object, a mountain ascends sufficiently, but it has a small decline. For this reason, a drop of the mountain-shaped distribution 1102 is that shown in FIG. 11C, and assumes a small value with respect to the maximum drop of the entire histogram shown in FIG. 11A.

Figure 11D:
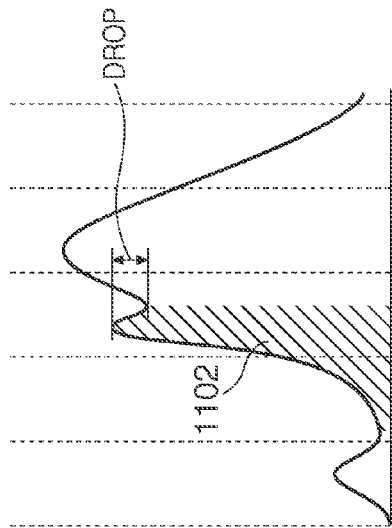

With respect to these mountain-shaped distributions having small influences on the scene, the mountain-shaped distribution 1103, which is formed by the mass of the principal object in the scene, as shown in FIG. 11D, defines a mountain which ascends and descends sufficiently. For this reason, a drop of the mountain-shaped distribution 1103 is that shown in FIG. 11D, and assumes nearly the same value as the maximum drop of the entire histogram shown in FIG. 11A.

In this manner, a larger weight can be given to the mountain-shaped distribution formed by the mass of the principal object in the scene of the plurality of mountain-shaped distributions detected from the histogram. Note that an example for implementing the processing for calculating weights of mountain-shaped distributions from drops between top and bottom peaks of the mountain-shaped distributions with respect to the maximum drop of the entire histogram is as have been described above using FIGS. 5A to 5D and FIG. 6.

As described above, weights for mountain-shaped distributions can be calculated from drops between top and bottom peaks of the mountain-shaped distributions with respect to the maximum drop of the entire histogram. However, a histogram in a scene, in which, for example, a dark part is distributed over a broad range, and which includes a large area of uniform blue sky, includes a high mountain due to blue sky in a high-luminance part, as shown in FIG. 12A. For this reason, a maximum drop in this histogram is calculated from the blue sky part, as shown in FIG. 12A. Then, as shown in FIG. 12A, both weight values of a mountain-shaped distribution 1201 which is distributed over a broad range in a dark part considered as a part to be corrected, and a mountain-shaped distribution 1202 corresponding to the blue sky part have large values. As a result, the mountain-shaped distribution 1201 is determined as a relatively low mountain-shaped distribution, and a degree of contribution to the feature amount calculation is reduced.

Hence, the third embodiment executes step S1001 as the second generation processing before execution of the weight value setting processing for mountain-shaped distributions in step S304. That is, the CPU 103 generates a second luminance histogram by giving weights which gradually decrease as luminance values are higher to a region having a specific luminance value or higher of a histogram, as shown in FIG. 12B. In step S304, the CPU 103 sets weight values for the second luminance histogram. As a result, the second luminance histogram shown in FIG. 12C is obtained from the histogram shown in FIG. 12A. Then, since a maximum drop is calculated from this second luminance histogram, as shown in FIG. 12C, a height of a mountain-shaped distribution of a dark part relatively rises. For this reason, in step S304, a weight value for the mountain-shaped distribution 1202 can be set to be low relative to that of the mountain-shaped distribution 1201 which is distributed over a broad range in a dark part. As a result, mountain-shaped distributions 1203 and 1204 shown in FIG. 12C are obtained. That is, the CPU 103 can calculate a large weight even for a mountain-shaped distribution which is distributed over a broad range in a dark part.

Note that FIG. 12A illustrates a histogram in a scene in which the mountain-shaped distribution of the dark part is distributed over a broad range, and the histogram is concentrated on the limited region of the high-luminance part. By contrast, operations executed for a scene having a histogram shown in FIG. 12D will be described below. In FIG. 12D, since a height of a mountain-shaped distribution 1205 on the most dark part side is higher than that of another mountain-shaped distribution 1206 located on the bright part side, a maximum drop is that shown in FIG. 12D. When the weights shown in FIG. 12B are given to this histogram, as in the above case, a second luminance histogram is obtained, as shown in FIG. 12E. When a maximum difference is calculated from the histogram shown in FIG. 12E, as shown in FIG. 12E, it is the same as that shown in FIG. 12D. That is, when the shape of a histogram is analyzed by the method of this embodiment, appropriate weight values can be effectively set for a scene in which the influence of a mountain-shaped distribution concentrated on a limited region of a high-luminance part is unnecessarily large, as shown in FIG. 12A, and weight values can be set for a scene shown in FIG. 12D without giving an unwanted influence.

Using the weights for the mountain-shaped distributions calculated in steps S1001 and 5304 in this way, the CPU 103 calculates a feature amount of the luminance histogram shape in step S305. In this embodiment, upon calculating a feature amount, frequencies of luminance levels included in respective mountain-shaped distributions are weighted and added from the lower-luminance side, and the weighted sum is then averaged to calculate an average luminance of a dark part included in an image, thus determining the average luminance as a feature amount. For this reason, in this embodiment, a feature amount is calculated by:

$$\frac{\sum_{i=1}^{M} \sum_{k=m_{iL}+1}^{m_{iR}} k f(k) r(i)}{\sum_{i=1}^{M} \sum_{k=m_{iL}+1}^{m_{iR}} f(k) r(i)} \quad (4)$$

where M is the number of mountain-shaped distributions, $m_{iL}$ is a luminance of a bottom peak on the low-luminance side of mountain-shaped distribution i, $m_{iR}$ is a luminance of a bottom peak on the high-luminance side of mountain-shaped distribution i, f(k) is a frequency at luminance k, and r(i) is a weight of mountain-shaped distribution i.

Note that the frequency f(k) at luminance k used in this formula may use either that of the histogram before weighting in step S1001 or that of the second luminance histogram after weighting. When formula (4) uses the histogram before weighting in step S1001, the influence of the second luminance histogram is imposed only on:

the maximum drop used to calculate weights for mountain-shaped distributions in step S304; and the drops used to calculate weights for mountain-shaped distributions associated with luminance levels for which weights to be given to the histogram are set to be other than 1.0 in step S1001.

For this reason, this embodiment is effective for the scene having the histogram shown in FIG. 12A, as described above, while it can further reduce an influence on the scene having the histogram shown in FIG. 12D compared to the case using the second luminance histogram.

As described above, the feature amount calculation unit of this embodiment allows more preferable correction even for a scene in which luminance levels of a part to be corrected are distributed over a broad range, and a histogram is concentrated on a limited region.

Referring back to FIG. 10, the CPU 103 generates a correction table in step S306. The generation processing of the correction table is as described in the first embodiment. In step S307, the CPU 103 executes tone correction using the correction table obtained in step S306. The tone correction processing is also as described in the first embodiment.

As described above, according to the third embodiment, since a feature amount is calculated from mountain-shaped distributions of a histogram, a feature of a dark part in an image can be effectively extracted, and a correction amount more suited to that image can be defined. In this embodiment, upon calculation of a feature amount required to determine tone correction characteristics (tone correction curve), a more preferred feature amount can be calculated even for a scene in which luminance levels of a part to be corrected are distributed over a broad range, and a histogram is concentrated on a limited region.

<Fourth Embodiment>

The third embodiment demonstrated that by generating a second luminance histogram by applying weight values corresponding to luminance levels to respective frequencies as a histogram to be analyzed, feature amounts can be suitably calculated in analysis of various histogram shapes. Therefore, the aforementioned third embodiment has exemplified the case in which a feature amount of a scene is calculated using weights based on drops between top and bottom peaks of mountain-shaped distributions as criteria upon analyzing a histogram shape. However, the present invention is not limited to such specific embodiment. The fourth embodiment will explain, as another example of the histogram shape analysis method, a case in which a feature amount of a scene is calculated using weights each of which is calculated based on a ratio of a total of frequencies included in a certain mountain-shaped distribution with respect to all frequencies as a criterion. Note that the fourth embodiment can be implemented using an image sensing apparatus shown in FIG. 1 or an information processing apparatus shown in FIG. 2 as in the third embodiment.

The processing sequence of the fourth embodiment is common to that of the aforementioned third embodiment. However, in the fourth embodiment, a weight for a mountain-shaped distribution is calculated using a ratio of a total of frequencies included in that mountain-shaped distribution with respect to all frequencies, that is, a frequency ratio, as a criterion, in step S1001.

Figure 13:
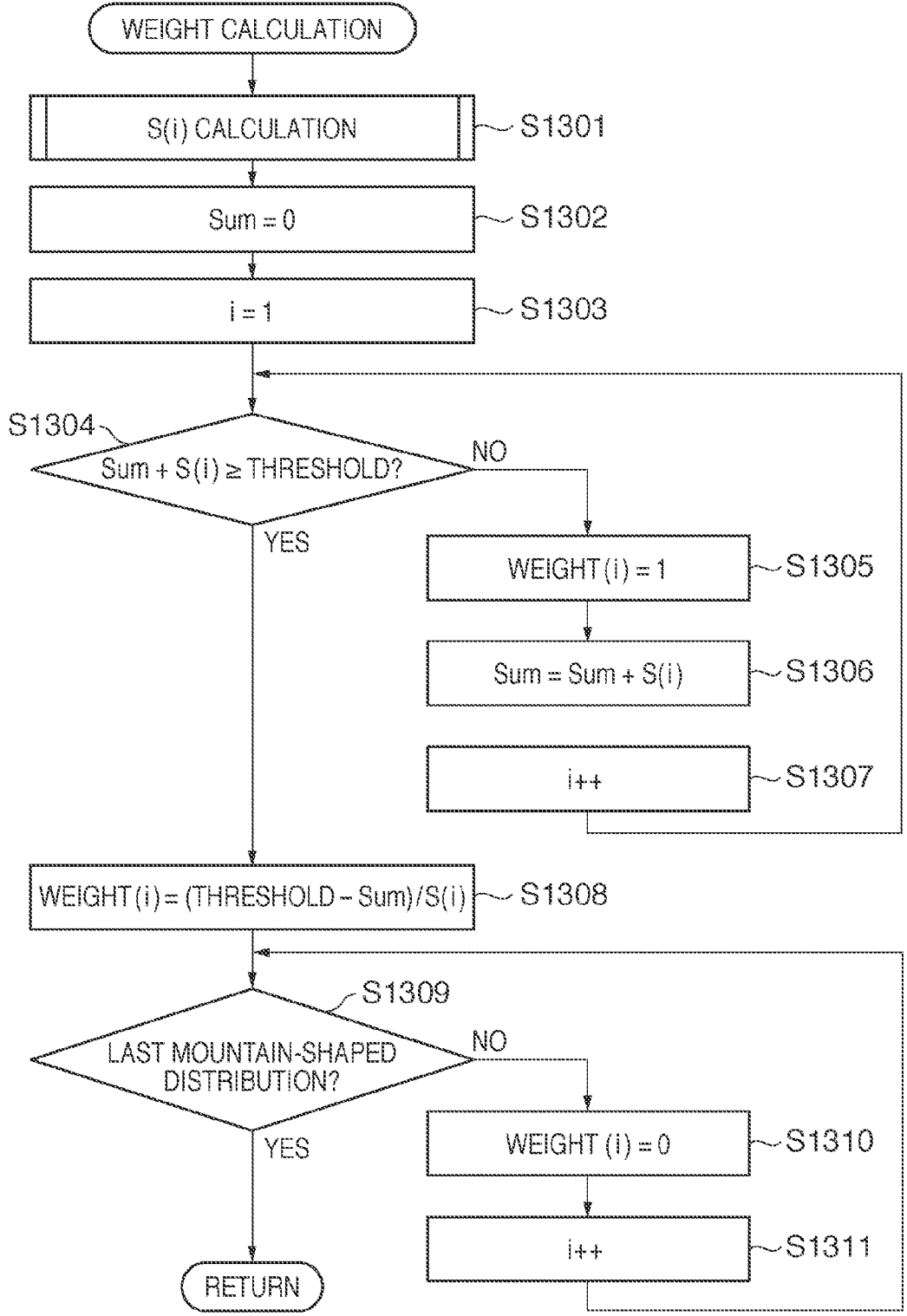
FIG. 13 is a flowchart showing weight calculation processing according to the fourth embodiment.

In the fourth embodiment, mountain-shaped distributions are added until a total of the frequency ratios becomes larger than a certain threshold, and its average is calculated to calculate a feature amount of a dark part. The feature amount calculation is implemented by formula (4) as in the third embodiment, and an example that implements calculation processing (that in step S304) of weights for mountain-shaped distributions required to calculate formula (4) on a program will be described below using FIG. 13.

In step S1301, a CPU 103 calculates, for respective mountain-shaped distributions, a ratio S(i) of a total of frequencies included in mountain-shaped distribution i with respect to all frequencies by:

$$S(i) = \frac{\sum_{k=m_{iL}+1}^{m_{iR}} f(k)}{\sum_{i=1}^{M} \sum_{k=m_{iL}+1}^{m_{iR}} f(k)} \quad (5)$$

where M is the number of mountain-shaped distributions, $m_{iL}$ is a luminance of a bottom peak on the low-luminance side of mountain-shaped distribution i, $m_{iR}$ is a luminance of a bottom peak on the high-luminance side of mountain-shaped distribution i, and f(k) is a frequency at luminance k.

In steps S1302 and S1303, the CPU 103 initializes a total Sum of frequency ratios calculated so far, and a number i of a mountain-shaped distribution for which a weight is to be calculated. In this case, i=1 indicates a mountain-shaped distribution located on the most dark part side, and i is incremented like i=2 and i=3 toward a brighter part side.

The CPU 103 checks in step S1304 if an accumulated value (Sum) obtained by adding the frequency ratio of mountain-shaped distribution i to the total of frequency ratios calculated so far is equal to or larger than a threshold. If the accumulated value is not equal to or larger than the threshold, the process advances to step S1305, and the CPU 103 sets "1" as a weight (i) of that mountain-shaped distribution i. The process then advances to step S1306. The CPU 103 adds the frequency ratio of mountain-shaped distribution i to the total of frequency ratios calculated so far in step S1306, and increments the mountain-shaped distribution number i in step S1307. The process then returns to step S1304. If the CPU 103 determines in step S1304 that the sum of the frequency ratio of mountain-shaped distribution i to the total of frequency ratios calculated so far exceeds the threshold, the process advances to step S1308. In step S1308, the CPU 103 sets, as a weight, a value obtained by dividing a value obtained by subtracting the total of frequency ratios calculated so far from the threshold by the frequency ratio of mountain-shaped distribution i, and the process then advances to step S1309. The CPU 103 sets "0" in all of weights for subsequent mountains by repeating processes in steps S1309, S1310, and S1311.

In this way, a weight can be calculated using, as a criterion, a ratio of a total of frequencies included in a mountain-shaped distribution with respect to all frequencies. In this case as well, a second luminance histogram which is described in the third embodiment and is obtained by weighting a histogram according to luminance levels can be used. In the fourth embodiment, by calculating weights using the second luminance histogram, a weight for a mountain-shaped distribution associated with a high-luminance side can be reduced, and that of a mountain-shaped distribution located on a dark part side can be relatively raised. In this manner, in a scene in which a histogram is concentrated on a limited region, an influence of a range, in which the histogram is concentrated, on analysis can be prevented from becoming unnecessarily large. The weights calculated in this way can be used in processes in step S306 and subsequent steps as in the third embodiment.

As described above, according to the third and fourth embodiments, more preferred correction can be applied to a scene in which luminance levels of a part to be corrected are distributed over a broad range, and a histogram is concentrated on a limited region.

The present invention has been described in detail by way of the preferred embodiments thereof. However, the present invention is not limited to these specific embodiments, and includes various embodiments within the scope without departing from the gist of the present invention. Some of the aforementioned embodiments may be combined as needed.

For example, since the present invention determines correction characteristics of tone correction using a histogram of parameter values indicating brightness levels of an image, the parameter values are not limited to luminance values of an image but they may be density values of an image. In an embodiment based on density correction, density values replace the luminance values in the above embodiments.

As described above, according to the respective embodiments, a feature amount more suited to an image having a complicated histogram shape can be calculated.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-201085, filed Aug. 31, 2009, and No. 2010-024831 filed Feb. 5, 2010, which are hereby incorporated by reference herein in their entirety.

What is claimed is:

1. An image processing apparatus for executing tone correction of luminance values in an image, comprising:
- a generation unit configured to generate, for the image, a luminance histogram in which frequencies indicating numbers of pixels for respective luminance values are arranged in an order of luminance values from a first side to a second side;
- a dividing unit configured to generate a plurality of partial histograms by dividing the luminance histogram at downward convex parts in a frequency distribution of the luminance histogram;
- a calculation unit configured to select one of the plurality of partial histograms as a partial histogram of interest, to calculate, as a drop candidate, a difference between a maximum frequency in one partial histogram located on the first side of the partial histogram of interest, and a minimum frequency within a range from a luminance level corresponding to the maximum frequency to a luminance level corresponding to a maximum frequency in the partial histogram of interest, and to determine, as a drop of the partial histogram of interest, a maximum one of the drop candidates calculated for all the partial histograms located on the first side of the partial histogram of interest;
- a setting unit configured to set, for the partial histogram of interest, a smaller weight with increasing drop; and
- a correction unit configured to execute the tone correction using a luminance histogram obtained by applying weights set by said setting unit respectively to the plurality of partial histograms.

2. The apparatus according to claim 1, wherein said correction unit acquires a luminance value as a feature amount required to determine correction characteristics in the tone correction by calculating a weighted average of the luminance histogram by applying the weights set by said setting unit respectively to the plurality of partial histograms, and executes the tone correction based on the luminance value.

3. The apparatus according to claim 2, wherein said correction unit determines the characteristics of the tone correction so that the acquired luminance value as the feature amount is converted into a predetermined luminance value.

4. The apparatus according to claim 3, wherein said correction unit determines the characteristics using a feature amount acquired when a lower luminance value side is defined as the first side and a higher luminance value side is defined as the second side, and a feature amount acquired when a higher luminance value side is defined as the first side, and a lower luminance value side is defined as the second side.

5. The apparatus according to claim 1, wherein a weight of a partial histogram located on the most first side of the plurality of partial histograms is set to be a maximum weight value.

6. The apparatus according to claim 1, wherein said generation unit uses, as the luminance histogram, a smoothed curve obtained by smoothing a histogram in which frequencies indicating numbers of pixels for respective luminance values are arranged in an order of luminance values from the first side to the second side.

7. The apparatus according to claim 1, further comprising:
- a unit configured to generate a second luminance histogram by applying weights according to luminance values to respective frequencies of the luminance histogram,
- wherein said calculation unit and said setting unit set the weight values using the second luminance histogram.

8. The apparatus according to claim 7, wherein said correction unit determines correction characteristics in the tone correction by calculating a weighted average of one of the luminance histogram and the second luminance histogram by applying the weights set by said setting unit respectively to a plurality of partial histograms in one of the luminance histogram and the second luminance histogram.

9. An image processing apparatus for executing tone correction of luminance values in an image, comprising:
- a generation unit configured to generate, for the image, a luminance histogram including frequencies indicating numbers of pixels for respective luminance values;
- a second generation unit configured to generate a second luminance histogram by applying weights according to luminance values to the luminance histogram;
- a setting unit configured to analyze a histogram shape using the second luminance histogram, and to set weight values for respective mountain-shaped distributions in the second luminance histogram; and
- an acquisition unit configured to acquire a feature amount for the tone correction by applying the weight values set by said setting unit to one of the luminance histogram and the second luminance histogram.

10. The apparatus according to claim 9, wherein the weights according to the luminance values have characteristics to decrease with increasing luminance value with respect to luminance values on a high-luminance side of a predetermined luminance value.

11. The apparatus according to claim 9, wherein said setting unit sets the weight values for the respective mountain-shaped distributions using a drop between a top peak and a bottom peak formed by each mountain-shaped distribution as a criterion.

12. The apparatus according to claim 9, wherein said setting unit sets the weight values for the respective mountain-shaped distributions using a ratio of a total of frequencies included in each mountain-shaped distribution with respect to all frequencies as a criterion.

13. A method of controlling an image processing apparatus for executing tone correction of luminance values in an image, comprising:
- a generation step of generating, for the image, a luminance histogram in which frequencies indicating numbers of pixels for respective luminance values are arranged in an order of luminance values from a first side to a second side;
- a dividing step of generating a plurality of partial histograms by dividing the luminance histogram at downward convex parts in a frequency distribution of the luminance histogram;
- a calculation step of selecting one of the plurality of partial histograms as a partial histogram of interest, calculating, as a drop candidate, a difference between a maximum frequency in one partial histogram located on the first side of the partial histogram of interest, and a minimum frequency within a range from a luminance level corresponding to the maximum frequency to a luminance level corresponding to a maximum frequency in the partial histogram of interest, and determining, as a drop of the partial histogram of interest, a maximum one of the drop candidates calculated for all the partial histograms located on the first side of the partial histogram of interest;
- a setting step of setting, for the partial histogram of interest, a smaller weight with increasing drop; and a correction step of executing the tone correction using a luminance histogram obtained by applying weights set in the setting step respectively to the plurality of partial histograms.

14. A method of controlling an image processing apparatus for executing tone correction of luminance values in an image, comprising:

a first generation step of generating, for the image, a luminance histogram including frequencies indicating numbers of pixels for respective luminance values;

a second generation step of generating a second luminance histogram by applying weights according to luminance values to the luminance histogram;

a setting step of analyzing a histogram shape using the second luminance histogram, and setting weight values for respective mountain-shaped distributions in the second luminance histogram; and an acquisition step of acquiring a feature amount for the tone correction by applying the weight values set in the setting step to one of the luminance histogram and the second luminance histogram.

15. A computer-readable storage medium storing a program for making a computer execute respective steps of a control method of an image processing apparatus according to claim 13.

16. A computer-readable storage medium storing a program for making a computer execute respective steps of a control method of an image processing apparatus according to claim 14.

* * * * *

UNITED STATES PATENT AND TRADEMARK OFFICE
CERTIFICATE OF CORRECTION

PATENT NO. : 8,351,698 B2
APPLICATION NO. : 12/862393
DATED : January 8, 2013
INVENTOR(S) : Kohei Furuya Page 1 of 1

It is certified that error appears in the above-identified patent and that said Letters Patent is hereby corrected as shown below:

On the title page:

(73) Assignee should read: Canon Kabushiki Kaisha, Tokyo (JP)

Signed and Sealed this
Twenty-sixth Day of March, 2013

Teresa Stanek Rea
*Acting Director of the United States Patent and Trademark Office*